United States Patent Office 3,344,107
Patented Sept. 26, 1967

3,344,107
REINFORCED POLYAMIDES CONTAINING PHOSPHORUS COUPLING AGENTS AND PROCESSES THEREFOR
Robert E. Miller, St. Louis County, Mo., assignor to Monsanto Company, a corporation of Delaware
No Drawing. Filed Dec. 26, 1963, Ser. No. 333,630
12 Claims. (Cl. 260—37)

This invention relates to reinforced polymeric compositions. In one aspect, this invention relates to a method of reinforcing polymeric compositions by chemically bonding a reinforcing medium to a polymer molecule through a phosphorus-containing compound. In another aspect, this invention relates to the polymeric compositions produced by the above method.

The term "reinforcing agent" or "reinforced medium" applies to substances subsequently described in detail whenever their incorporation into a polymer system is accompanied by enhancement of the mechanical properties of the product, achieved at least in part by incorporation of a coupling agent. This is in distinction to materials which serve only as fillers or diluents for a polymer system. Since the reinforcement produced by the practice of this invention is achieved by chemical bonding, the term "reinforced polymeric composition," or "reinforced polymer," refers to those compositions comprising a polymer and reinforcing agent wherein the reinforcing agent is chemically bound to the polymer through a third component referred to as a coupling agent. A coupling agent is a compound containing two or more reactive groups, at least one of which is capable of reaction with the polymer, and at least one of which is capable of reaction with a reinforcing agent. The term "mineral-reactive" as used in this disclosure refers to compounds or radicals reactive with mineral surfaces; the term "polymer-reactive" refers to compounds or radicals reactive with monomers either before or during polymerization or with polymers in such a manner that the "polymer-reactive" substituent is incorporated into the polymer molecule.

It is well known in the rior art that polymeric compositions can be "filled" with non-polymeric substances, i.e. materials which do not enter into the polymerization process can be mixed with a monomer feed or polymeric product to form a uniform finished product. The upper limit of filler that can be used in such mixtures without adversely affecting the mechanical properties of the product is low. The tensile and flexural strengths of some polymer systems fall off sharply at relatively low concentrations of filler. It has now been discovered that by proper combination of polymer, coupling agent, and inorganic material, the inorganic material no longer functions as a mere filler but actually becomes part of the polymeric composition. According to this invention, the mechanical properties of the polymer do not decrease with increasing proportions of filler, but rather are improved significantly at high proportions of reinforcing agent.

It is an object of this invention to provide reinforced plymeric compositions. It is a further object of this invention to provide a method for reinforcing polymeric compositions. Additional objects, benefits, and advantages will become apparent as the detailed description of the invention proceeds.

Basically, the present invention resides in the discovery that the mechanical properties of a polymer-mineral mixture can be improved by chemically bonding the polymer and mineral phases by means of compounds containing a pentavalent phosphorus atom, which phosphorus atom has attached thereto substituent groups capable of creating the desired chemical bond between the polymer and mineral.

The polymeric compositions of this invention comprise polymers reinforced with inorganic minerals which are chemically bound to the polymer through phosphorus-containing coupling agents, these coupling agents having at least one mineral-reactive radical and at least one radical capable of reaction with the particular polymer chosen for the composition.

REINFORCING AGENTS

The reinforcing agents of the present invention are selected from a wide variety of minerals, primarily metals, metal oxides, metal salts such as metal aluminates and metal silicates, other siliceous materials, and mixtures thereof. Generally, those materials which have or can acquire an alkaline surface upon treatment with a base are best suited for the polymeric compositions of this invention. Since metal silicates and siliceous materials usually have or can readily acquire the desired alkaline surface, a preferred mineral mixture for use in this invention is one which contains a major amount, i.e. more than 50% by weight, of metal silicates or siliceous materials. Materials with such characteristics are preferred because of the ease with which they are coupled to the polymer. However, other substances which are not easily coupled to a polymer by means of coupling agents employed herein, can nevertheless be used as a reinforcing component, either singly or preferably combined with other minerals which are more susceptible to coupling, and more preferably combined in minor amounts, i.e. percentages of less than 50% of the total reinforcing agent. An example of a useful reinforcing agent with which difficultly coupled minerals can be mixed is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a mixture of feldspar with other minerals is also useful. Other materials particularly preferred as reinforcing agents include: wollastonite, which is a calcium metasilicate; mullite, an aluminum silicate; asbestos such as chrysotile, a hydrated magnesium silicate, crocidolite, and other calcium magnesium silicates; and a fibrous aluminum silicate, $Al_2SiO_5$. Other useful reinforcing agents include: quartz and other forms of silica such as silica gel, glass fibers, beads and flakes, cristobalite, etc.; metals such as aluminum, tin, lead, magnesium, calcium, strontium, barium, titanium, zirconium, vanadium, chromium, manganese, iron, cobalt, nickel, copper, and zinc; metal oxides in general, such as oxides of aluminum, tin, lead, magnesium, calcium, strontium, barium, titanium, zirconium, vanadium, chromium, manganese, iron, cobalt, nickel, copper, and zinc; heavy metal phosphates, sulfides and sulfates in gel form; and basic minerals and mineral salts such as spodumene, mica, montmorillonite, kaolinite, bentonite, hectorite, beidellite, attapulgite, chrysolite, garnet, saponite, and hercynite.

The term "mineral" as used in this disclosure includes all the inorganic materials described above; consequently the term "mineral" is used synonymously with "reinforcing agent" to include all the classes of inorganic materials defined by the above examples, whether naturally occurring or synthetically produced.

The amount of reinforcing agent to be used in the preparation of the polymeric compositions varies over a wide range with the maximum content being limited primarily by the ability of the polymer to bind the reinforcing medium into a cohesive mass. Techniques subsequently described herein have enabled one to prepare polymeric compositions containing as much as 90 or 95% by weight reinforcing agent.

The lower range of reinforcing agent concentration is limited only insofar as it is necessary to have sufficient material present to effect an improvement in physical properties of the polymeric compositions. Consequently, reinforcing agent concentrations as low as 5% by weight or less can be used, particularly if the finished composition is to be extruded into filament form. A preferable lower limit for the mineral reinforcing agent, especially in the case of molded compositions, is 40% by weight of the total composition, and more preferably 50% by weight. Suitable values, therefore, for reinforcing agent concentration in the finished composition range from about 5 to about 95%, preferably from about 40 to about 95%, and more preferably from about 50 to about 90% by weight.

Particle shape and size of the reinforcing agent affect physical properties of the finished composition. In a preferred aspect of this invention, the reinforcing medium is admixed with a monomer or prepolymer and subsequently cast into a mold where the polymer is formed and cured. In such a method, the viscosity of the monomer or prepolymer-mineral slurry becomes a limitation on the maximum amount of reinforcing agent which can be used, i.e. too high a mineral concentration produces mixtures too viscous to cast into molds. This limitation on mineral concentration imposed by the viscosity is in turn dependent upon the shape of the particulate mineral. For example, spherical particles do not increase the viscosity of the monomer mixture as much as fibrous materials. By adjusting the particle shape of a mineral reinforcer and thereby controlling the viscosity of the monomer mixture, it is possible to prepare improved castable or moldable polymeric compositions containing a very large amount of reinforcing mineral.

Another factor which has an effect on the upper limit of reinforcing agent concentration is the particle size distribution of the material. A wide distribution of particle sizes provides a composition with a small amount of voids or spaces between the particles, thereby requiring less polymer to fill these spaces and bind the particles together. Proper combination of the two variables of particle shape and size distribution enables me to prepare the highly reinforced compositions of this invention.

Particle size distribution as previously noted is a variable which has an effect upon the degree of mineral loading possible. Regarding particle size, generally particles which pass through a 60 mesh screen are small enough to be used in the compositions of this invention although particles as large as 1,000 microns (18 mesh) can be used with equal or nearly equal success; regarding a lower limit on particle size, particles as small as $0.5\mu$ have been successfully employed and particles in the range of 200 to 400 millimicrons can also be used. More descriptive of suitable mineral particles than limits on particle size is a specification of particle size distribution. A suitable wide particle size distribution is as follows:

| | Percent |
|---|---|
| $250\mu$ or less (60 mesh) | 100 |
| $149\mu$ or less (100 mesh) | 90 |
| $44\mu$ or less (325 mesh) | 50 |
| $5\mu$ or less | 10 |

A narrower distribution also suitable for use in this invention is:

| | Percent |
|---|---|
| $62\mu$ or less (230 mesh) | 100 |
| $44\mu$ or less (325 mesh) | 90 |
| $11\mu$ or less | 50 |
| $8\mu$ or less | 10 |

A relatively coarse mixture useful in the compositions of this invention has the following particle size distribution:

| | Percent |
|---|---|
| $250\mu$ or less (60 mesh) | 100 |
| $149\mu$ or less (100 mesh) | 90 |
| $105\mu$ or less (140 mesh) | 50 |
| $44\mu$ or less (325 mesh) | 10 |

A suitable finely divided mixture has the following particle size distribution:

| | Percent |
|---|---|
| $44\mu$ or less (325 mesh) | 100 |
| $10\mu$ or less | 90 |
| $2\mu$ or less | 50 |
| $0.5\mu$ or less | 10 |

These figures regarding particle size distribution should not be construed as limiting since both wider and narrower ranges of distribution will also be useful as well as both coarser and finer compositionss. Rather these figures are intended as representative illustrations of mineral compositions suitable for use in the reinforced polymeric compositions of this invention.

The reinforcing agents perform a dual function in the finished compositions. First, depending upon the material selected, they may serve as an inexpensive diluent for the polymer, thereby lowering the cost of the final product. Secondly, and more important, these minerals, when bound to the polymer in accordance with this invention, produce compositions having mechanical properties far superior to those of unreinforced polymers, thereby permitting the use of the reinforced compositions in applications heretofore closed to the unreinforced polymers.

To achieve the benefits of this invention, namely the production of easily castable or moldable highly reinforced polymeric compositions plus lower cost from higher loadings of reinforcing minerals, it is necessary that the reinforcing agent be substantially granular in shape rather than fibrous. However, a small amount of fibrous material may be incorporated into a polymer system if the amount of granular material is reduced by some proportionately larger amount. Alternatively, if castability is not required, larger amounts of fibrous material can be included in the composition, thereby reinforcing the final product to an even greater extent.

The most common fibrous reinforcing agent used is fibrous glass. These fibers are most easily incorporated into the polymeric composition when chopped into strands approximately ⅛ to 3 inches in length, and then either added to a prepolymer-coupler mixture as discrete particles or formed into a mat upon which the prepolymer is poured prior to polymerization. Such methods of incorporation of glass fibers are well known in the art and are mentioned here to emphasize that the granularly reinforced polymers of this invention can be additionally reinforced by incorporation of fibrous materials according to techniques well known in the art or according to procedures described herein as applicable to granular reinforcing agents.

POLYMERS

The polymers which can be reinforced according to the present invention are the synthetic high molecular weight materials having a molecular weight of about 2,000 or more produced by either addition or condensation polymerization.

An important class of polymers which is beneficially modified according to this invention includes those obtained from a polymerizable monomer having a carbon-carbon double bond, $>C=C<$. Such polymers include the polyalkenes formed from monomers such as ethylene, propylene, and isobutylene; the polydialkenes formed from monomers such as butadiene and isoprene; the halogenated polyalkenes from monomers such as vinyl chloride, vinylidene chloride, vinylidene chlorofluoride, tetrafluoroethylene and chlorotrifluoroethylene; the vinyl resins such as polyvinyl acetal, polyvinyl acetate, polyvinyl alcohol, polyvinyl butyral, and polyvinyl carbazole; the polystyrenes formed from monomers such as styrene and α-methylstyrene; and the acrylic resins formed from such monomers as acrylic acid, methacrylic acid, methyl acrylate, ethyl acrylate, methyl methacrylate, ethyl methacrylate, and acrylonitrile.

Other synthetic polymers capable of reinforcement are the cellulose derivatives, e.g. cellulose esters such as cellulose acetate, cellulose triacetate, cellulose acetate butyrate, and cellulose propionate, and cellulose ethers such as methyl or ethyl cellulose, cellulose nitrate, rayon, cellophane, etc.

Acetal resins are another group of polymers capable of reinforcement according to this invention. This class comprises those resins formed by the addition polymerization of formaldehyde or higher aldehydes to produce an oxymethylene or substituted oxymethylene linkage.

Resins formed by the condensation of an aldehyde with other materials can also be reinforced according to this invention. These resins include the phenolics, formed by the condensation of phenol, cresol, xylenol, or other substituted phenols with formaldehyde or higher aldehydes; the melamine resins, formed by the condensation of melamine and formaldehyde or higher aldehydes; and resins formed by the condensation of urea and formaldehyde or higher aldehydes.

Other polymer systems which can be reinforced according to this invention include the furan resins obtained by the polymerization of furfural or furfuryl alcohol, and by copolymerization of furfural and a ketone; coumarone-idene resins; casein resins; silicone elastomers; polycarbonate resins formed by polymerization of unsaturated, cyclic esters of carbonic acid such as vinylene carbonate and allyl diglycol carbonate, or by condensation of phosgene with diol; and epoxy resins formed by condensation of a halogenated alkylene oxide such as epichlorohydrin with a polyhydric compound such as ethylene glycol or bis-phenol.

Preferred polymers suitable for use with this invention are the polyesters formed by reaction of a polyhydric alcohol with a saturated or unsaturated polycarboxylic acid, acid anhydride, or acyl halide. Particularly preferred are the polyesters formed from an unsaturated acid and an alkylene glycol or dialkylene glycol, which product is subsequently crosslinked by further reaction with a compound containing a $CH_2=C<$ group such as styrene, ethyl acrylate, methyl methacrylate, acrylonitrile, vinyl acetate, or acrolein.

Other preferred polymers are the polyurethane resins prepared by reaction of polyols, polyesters, or polyethers with a polyisocyanate such as tolylene diisocyanate. Still other preferred polymers are the polyamides produced by the condensation of a diamine with a dicarboxylic acid, or by the addition polymerization of cyclic amides, or by some other method. Particularly preferred polyamides are the nylons, such as nylon 6 (from ε-caprolactam) and nylon 66 (from hexamethylenediamine and adipic acid).

Another related group of polymeric constituents which can be modified to form compositions included within the scope of this invention are copolymers and terpolymers of the above groups. Examples of such polymers include polymerized butadiene/styrene, vinyl chloride/vinyl acetate, vinyl chloride/vinyloxyethanol, ethylene/maleic anhydride, butadiene/styrene/vinyl benzene, styrene/epoxide/maleic anhydride, and many others.

In addition, certain resins can be modified by incorporation of a reactive group into the polymer chain during polymerization. The coupling agent is then selected so that it is capable of reaction with the group incorporated into the polymer chain. Such "tailoring" or selective copolymerization of the polymer molecule is desirable when a stable chemical bond cannot be readily attained between the polymer and coupler. An example of a tailored polymer is found in German Patent 1,108,433, wherein epoxy groups are incorporated into a polycarbonate resin by the reaction of phosgene, Bisphenol A, and epichlorohydrin to form an epoxy-capped polycarbonate. A reinforced epoxy-capped polycarbonate can be obtained by adding a reinforcing agent treated with the epoxy or amino-containing coupling agent to the monomer or prepolymer mixture and subsequently polymerizing the mixture. Other examples of "capping" or selective copolymerization will become apparent to those skilled in the art in view of this disclosure.

Useful polymers for the preparation of my compositions may be linear or crosslinked. I have found that a crosslinked polymer provides some improvement in physical properties, particularly impact resistance, but linear polymers are also included within the scope of this invention. The maximum amount of tolerable crosslinking in the polymer depends upon the proposed use of the finished composition. Increased crosslinking produces compositions with higher impact resistance and somewhat diminished flexural strength and modulus. Consequently, control of crosslinking provides a variable which enables one to tailor the polymer in many respects to produce a composition of the desired properties. Suitable crosslinking agents known in the art can be used. Generally those compounds which contain a multiplicity of groups capable of incorporation into a polymer chain are suitable crosslinking agents. Examples include unsaturated polyesters, divinylbenzene, bis-fumarates, bis-maleates, peroxides, polyethylene imines, etc.

COUPLING AGENTS

Phosphorus-containing compounds useful as coupling agents in reinforced polymers are defined by the following generic formula

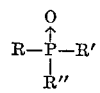

where R is a radical capable of reaction with a hydroxyl group; where R' is a radical capable of incorporation into a polymer, and where R'' is a radical either capable of reaction similar to R or R' or incapable of reaction similar to R or R'.

The R groups include those capable of direct reaction with the mineral surface of the reinforcing agents of this invention. It has been determined that groups reactive with hydroxyl groups in an acid-base neutralization, an hydrolysis reaction, an ester interchange reaction, or some other mechanism are also reactive with the surfaces of reinforcing agents. Also included within the scope of this invention are phosphorus-containing compounds, the R groups of which are rendered more susceptible to reaction with mineral surfaces by prior reaction with water. Hydrolysis of a coupling agent according to the equation

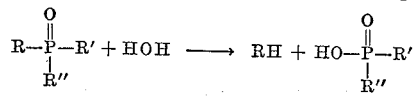

produces a phosphinic or phosphonic acid compound which can be readily reacted with a basic mineral surface. Examples of suitable R groups include halogen, hydroxyl, hydrocarbyloxy, and hydrocarbyl carboxylate radicals. The term "hydrocarbyl" includes organic radicals consisting solely of carbon and hydrogen.

The R' groups in the general formula represent radicals reactive with a polymer system. Since the function of the R' groups is to chemically react with a polymer, thereby producing a bond between the polymer and reinforcing medium, and since there are many types of polymer systems which can be improved by the practice of this invention, not all the possible phosphorus-containing coupling agents included within the scope of this invention will perform as satisfactory couplers for all the polymer systems. Rather the R' group must be selected to provide a substituent capable of reacting with the chosen monomer or polymer system. For instance, dimethyl allylphosphonate, $(CH_3O)_2P(O)CH_2CH=CH_2$, is a suitable coupler for a polyester system; the methoxy groups can react with a reinforcing agent and the allyl group is capable of interpolymerization into the polyester molecule during polymerization of the prepolymer, thereby providing the requisite chemical bond. This same compound is an inadequate coupler in a polylactam system where the catalyst and initiator do not promote polymerization of compounds containing ethylene unsaturation. Consequently, the selection of a suitable R' group is dependent upon the particular polymer to be used in the composition. As an example, an epoxy-containing coupling agent is a compound suitable for reaction with an epoxy resin. Alkenyl, acrylic, and methacrylic-containing coupling agents are suitable for use with vinyl, acrylic, alkene, styrene, and in general those resins formed from monomers containing an olefinic double bond. Resins such as the epoxides, furans, phenolics, melamines, phenol/formaldehydes, urea/formaldehydes, urethanes, and amides can be coupled to a reinforcing medium through an amino-containing coupling agent. Resins such as the alkyl celluloses and cellulose organic esters can be coupled to a reinforcing medium through an epoxy-containing coupling agent. Other equally compatible polymer-coupler systems will be readily apparent to those skilled in the art in view of this disclosure. Examples of R' include hydrogen, alkenyl, amino, imido, ureido, epoxy, isocyanato, carbalkoxy, acyl, and acyloxy radicals.

The R'' group in the general formula can be identical to or similar in reactivity to either R and R', or R'' can be any unreactive substituent, i.e. any radical which will not react with a mineral surface and which will not react with a monomer system before or during polymerization. Preferred examples of R'' are alkyl radicals having at least two carbon atoms. The presence of an unreactive radical in a coupling agent is occasionally desirable since it may influence the nature and extent of mineral-coupler or coupler-polymer bonding. Often an unreactive radical is present in a coupling agent because its presence in one of the reactants used to prepare the coupling agent was helpful in producing a higher yield of the coupling agent. Reactive hydrocarbyl radicals, such as alkenyl radicals, can of course be used to increase the yield of a coupling agent synthesis, but alkenyl radicals are themselves reactive with some polymers useful in this invention; consequently, they succeed in modifying the polymer-coupler bond by interpolymerizing into the polymer chain as a polymer-reactive radical.

The phosphorus-containing compounds designated below and elsewhere herein are named according to the rules for compounds having one phosphorus atom as approved by the nomenclature committee of the Organic Division of the American Chemical Society ("Chemical and Engineering News," Vol. 30, No. 43, pp. 4515 to 4522, October 27, 1952). Examples of compounds included within the above generic formula are:

phosphinic acid, $H_2P(O)OH$;
phosphonic acid, $HP(O)(OH)_2$;
phenyl hydrogen vinylphosphonate, $CH_2=CHP(O)(OH)(OC_6H_5)$;
methylphosphonamidic chloride, $CH_3P(O)ClNH_2$;
diallyl allylphosphonate, $CH_2=CHCH_2P(O)(OCH_2CH=CH_2)_2$;
dimethyl phosphonate, $HP(O)(OCH_3)_2$;
phosphorisocyanatidodichloridic acid, $(Cl)_2P(O)NCO$;
β-chloroethyl hydrogen (2-phenylacrylyl)phosphonate, $CH_2=C(\phi)COP(O)(OH)(OCH_2CH_2Cl)$;
dimethyl (2,3-epoxypropyl)phosphonate,

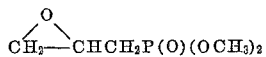

diacetyl allylphosphonate, $CH_2=CHCH_2P(O)(OOCCH_3)_2$;
dicarbethoxyphosphinic acid, $(C_2H_5OOC)_2P(O)OH$;
sodium phosphorodiamidate, $(NH_2)_2P(O)(ONa)$;
acrylylphosphonic acid, $CH_2=CHC(O)P(O)(OH)_2$;
dimethyl ureidophosphoric acid, $(CH_3O)_2P(O)NCC(O)NH_2$; and
diethyl γ-aminopropylphosphonate, $(C_2H_5O)_2P(O)CH_2CH_2CH_2NH_2$ Preferred compounds according to the above formula are those wherein the mineral-reactive group R is an alkoxy or hydroxy radical and where the polymer-reactive group is separated from the phosphorus atom by an alkylene linkage, e.g. where R' is γ-aminopropyl, $NH_2CH_2CH_2CH_2—$; ethyl hexanato, $C_2H_5OOCC_5H_{11}—$; or 3,4-epoxybutyl,

Particularly preferred phosphorus acids and esters are those in which the R' group contains an alkylene radical having from about six to twenty or more carbon atoms, and more preferably from about eight to about twenty carbon atoms. These compounds, in addition to providing reinformed polymers, also impart a wetting action to a monomer-coupler-mineral slurry, thereby making the slurry more fluid and permitting the incorporation of even larger amounts of reinforcing agent with a consequent further improvement in mechanical properties of the finished polymeric composition. In addition to a wetting action, the long chain phosphorus compounds provide a hydrophobic polymer-mineral bond, thus making the corresponding reinforced polymers water-resistant and less susceptible to the weakening effect of water.

The preferred phosphorus-containing coupling agents of this invention can be prepared according to methods described by: R. Sasin et al., J. Am. Chem. Soc., 81, 6275 (1959); A. R. Stiles et al., J. Am. Chem. Soc., 80, 714 (1958); J. Finkelstein, J. Am. Chem. Soc., 68, 2397 (1946); and G. M. Kosolapoff, J. Am. Chem. Soc., 69, 2112 (1947), all of which articles are incorporated herein by reference. Other phosphorus acids and esters included within the generic formula but not referred to in the above references can be prepared by other or similar methods and techniques well known to those skilled in the art.

PREPARATION OF REINFORCED POLYMERIC COMPOSITIONS

Bonding of the reinforcing medium to the polymer is achieved by means of a phosphorus-containing compound having at least one radical capable of reaction with the mineral reinforcing medium and at least one radical capable of reaction with the selected polymer. The mineral and coupler are joined by mixing them in an aqueous or anhydrous medium. It is theorized that the mineral-reactive radicals react with hydroxyl groups appended to the siliceous mineral surface, thereby splitting off a by-product and producing the linkage,

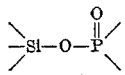

In some situations, a suspension of mineral in aqueous medium is advantageous in achieving good contact of mineral and coupler, especially if the mineral is in very finely divided form. In such a case, the mineral-reactive radical may be first converted to a hydroxyl radical, which then reacts with surface hydroxy groups to produce a siloxy-phosphonyl bond. The reluctance of some materials to acquire surface hydroxyl groups may explain why they are not themselves chemically bound to the polymer and require mixing with siliceous minerals which can be so bound to produce compositions of high strength and modulus. Regardless of any theoretical explanation advanced herein to which I do not intend to be bound, the mineral-reactive radical is attached to the mineral, forming a stable bond therebetween. This reaction of mineral and coupler may be carried out separately, and the mineral-coupler adduct subsequently added to a monomer system, or the reaction may be carried out in the presence of a monomer prior to polymerization; or the coupler may be bound to a polymer during polymerization, thereby producing a polymer with appended mineral-reactive groups which may subsequently be reacted with the mineral to produce a reinforced composition.

The amount of coupler with which the reinforcing agent is treated is relatively small. As little as one gram of coupling agent per 1,000 grams of reinforcing agent produces a polymeric composition with physical properties superior to those of a polymeric composition containing an untreated filler. Generally, quantities of coupler in the range of 3 to 20 grams per 1,000 grams of reinforcing agent have been found most satisfactory although quantities in excess of that range can also be used.

Polymerizations are carried out by methods well known to those skilled in the art using appropriate catalysts, promoters, regulators, stabilizers, curing agents, etc., necessary to achieve the polymerization of a selected monomer or monmers.

In the preparation of castable compositions, it may be advisable, particularly in the case of high loadings of reinforcing agent where a slight increase in viscosity of the monomer-mineral mixture cannot be tolerated, to provide means for injection of the catalyst, or alternately the promoter, into the monomer as it is being poured into the mold. Such a technique completely prevents an increase in viscosity of the monomer mixture due to polymerization before the mixture is cast. Another technique useful with high loadings of reinforcing agents, which aids in overcoming the difficulties presented by high viscosity, is a pressurized injection of the monomer mixture into the mold.

A technique which has been found useful in decreasing the viscosity of monomer-mineral slurries comprises adding a small amount of a surface-active agent to the slurry. Such a decrease in viscosity is advantageous for two reasons. It permits the formation of a finer, smoother finish on the final product. Occasionally a finished composition with a high content of reinforcing mineral, e.g. 75% mineral, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. Alternatively, if a smooth finish is not a necessary feature for certain applications, then a decrease in viscosity permits incorporation of larger amounts of reinforcing agents into the monomer feed. This surface active agent may be either anionic, cationic, nonionic, or mixtures thereof. Examples include zinc stearate, dioctadecyl dimethylammonium chloride, and ethylene oxide adducts of stearic acid. Preferred compounds are the metal and ammonium salts of long-chain carboxylic acids, and quaternary ammonium compounds containing at least one long chain alkyl radical. A concentration of surfactant in the range of 0.05 to 0.5% by weight of the total composition has been found useful. However, concentrations lower than 0.05% can also be used with somewhat diminished results. At concentrations higher than 0.5% it may be necessary to use additional catalyst and promoter.

The viscosity of a monomer-mineral slurry can also be reduced by proper choice of a coupling agent. Coupling agents according to the generic formula given above where the R' contains in addition to the polymer reactive substituent a long-chain alkylene radical having from about 6 to about 20 carbon atoms are compounds suitable for reducing the viscosity of, and thereby improving castability and moldability of, monomer-mineral mixtures.

Processing and molding techniques applicable to unfilled or unreinforced polymeric systems can be used in the practice of this invention. For instance, compression molding, transfer molding, injection molding, and blow molding are not rendered inoperative because of the presence of coupler and reinforcing agent.

Utilization of the procedures described above and in the following examples permits the preparation of granularly reinforced polymeric compositions posessing flexural strengths significantly greater than the corresponding unreinforced polymers. Since the flexural strength of a filled polymer does not increase and often decreases with increasing concentrations of filler above 50%, even more significant improvement is achieved at higher mineral concentrations, e.g. 60% and greater.

The invention will be more clearly understood from the detailed description of the following specific examples which set forth representative preferred coupling agents and their method of prepartion, some of the preferred polymeric compositions, the methods of preparing them, and the superior physical properties attained by the practice of this invention.

*Example 1*

To a stirred slurry of 80 grams of wollastonite in water was added 0.8 gram of phosphonic acid. The mixture was filtered and the treated wollastonite dried at 80° C. in vacuo. The mineral was then added to a mixture comprising 20 grams of Paraplex P-43 (a 70/30 mix of an unsaturated polyester prepolymer in styrene) and 0.4 gram of a 50/50 benzoyl peroxide/tricresyl phosphate catalyst. The resulting mixture was placed in a Banbury mixer and blended for 5 to 10 minutes. The dough-like mix was then molded and polymerized for 10 minutes at 105° C. and 300 p.s.i. The product was postcured at 160° C. for 20 hours.

*Example 2*

The procedure described in Example 1 was followed except that in place of the phosphonic acid, an equal quantity of diethyl phosphonate was used as the coupling agent. Following mixing and polymerization, the product was postcured at 170° C. for six hours.

*Example 3*

The procedure described in Example 1 was followed except that in place of the phosphonic acid, an equal quantity of diallyl allylphosphonate was used as the coupling agent. Following mixing and polymerization, the product was postcured at 170° C. for six hours.

*Example 4*

To 80 grams of wollastonite was added 0.8 gram of β-chloroethyl hydrogen (α-phenylvinyl phosphonate, $$CH_2=C(\phi)P(O)(OH)(OCH_2CH_2Cl)$$

20 grams of Paraplex P-43 polyester prepolymer, and 0.4 gram of a 50/50 paste of benzoyl peroxide/tricresyl phosphate. The resulting mixture was blended in a Banbury mixer for 5 to 10 minutes. The dough-like mix was then molded and polymerized for 10 minutes at 105° C. and 300 p.s.i. The product was postcured at 160° C. for 20 hours.

*Example 5*

The procedure described in Example 4 was followed except that in place of the phosphonate coupler, an equal quantity of β - bromoethyl - β-chloroethyl-(β-bromo-β-methacrylato)propyl phosphate, $(BrCH_2CH_2O)(ClCH_2CHO)P(O)$

was used as the coupling agent. Following mixing and polymerization, the product was postcured at 160° C. for 20 hours.

*Example 6*

Thte run described in Example 5 was repeated except that the product was postcured at 170° for 5 hours.

*Example 7*

The procedure described in Example 4 was followed except that ammonium phosphinate was used as the coupling agent. Following mixing and polymerization, the product was postcured at 160° C. for 20 hours.

Example 8

A quantity of 7.0 grams of diethyl ethyl-3-propionatophosphonate, $(C_2H_5O)_2P(O)CH_2CH_2COOC_2H_5$, was added to an aqueous suspension of 650 grams of wollastonite. After stirring, the wollastonite was filtered and dried in vacuo at 80° C. A quantity of 400 grams of ε-caprolactam was melted in a flask and the treated wollastonite was added with stirring. The mixture was heated to 150° C. under a slight vacuum to remove impurities, and the distillation was continued until 50 grams of caprolactam had also been removed. The vacuum was released and the mixture allowed to cool to 115° C. in a dry nitrogen atmosphere, at which time 7.2 grams of Mondur MR (a polyfunctional isocyanate) was added and mixed for several minutes. To this mixture, 8.3 ml. of a 3 M solution of ethylmagnesium bromide in diethyl ether was added slowly with stirring. Again a vacuum was applied until all the ether and ethane were removed, as evidenced by the complete dispersal of the catalyst in the mixture. After release of the vacuum, the slurry was poured into a mold preheated to 200° C. and polymerized at 200° C. for one hour.

Example 9

The procedure described in Example 8 is followed except that 6.5 grams of the reaction product of allylamine with diethyl hydrogen phosphonate, designated as diethyl 3-(aminopropyl)phosphonate, was used as the coupling agent.

Example 10

A quantity of 400 grams of ε-caprolactam was melted in a flask to which was added with stirring 650 grams of wollastonite and 6.5 grams of diethyl ethyl-11-undecanatophosphonate, $$(C_2H_5O)_2P(O)(CH_2)_{10}COOC_2H_5$$

The mixture was heated to 150° C. under a slight vacuum to remove ethanol and the distillation continued until 50 grams of caprolactam had also been removed. The catalyst and promoter were added as described in Example 8 and the slurry poured into a mold preheated to 175° C. and polymerized at that temperature for two hours.

Example 11

A quantity of 650 grams of wollasonite was treated with 6.5 grams of diethyl ethyl-11-undecanatophosphonate, $(C_2H_5O)_2P(O)(CH_2)_{10}COOC_2H_5$, dissolved in 50 ml. of dioxane. After stirring thoroughly, the wollastonite was filtered and dried at 225° C. for two hours. To the treated mineral was added 400 grams of ε-caprolactam. After heating the monomermineral slurry at 150° C. under reduced pressure until 50 grams of caprolactam was removed by distillation, a catalyst and promoter were added as described in Example 8 and the slurry poured into a mold preheated to 175° C. and polymerized at that temperature for two hours.

Table 1 below reports mechanical properties of the polymeric compositions of this invention. The flexural strengths and modulus properties were determined in accordance with A.S.T.M. D 790–61. Values for wet strength and modulus were measured on samples subjected to a four hour immersion in boiling water. Composition A is an unfilled, unreinforced polyester prepared according to Example 1 of this disclosure except that no reinforcing agent or coupling agent was used. Composition B is a filled polyester prepared according to Example 1 of this disclosure except that no coupling agent was used. Compositions C and D are unfilled, unreinforced polycaprolactam and filled, unreinforced polycaprolactam samples, respectively, prepared according to Example 8 of this disclosure. The numerical designations of polymeric compositions indicate compositions prepared in the manner described in the corresponding examples.

TABLE 1

| Polymeric Composition | Dry | | Wet | |
|---|---|---|---|---|
| | Flexural Strength, p.s.i. | Flexural Modulus, p.s.i. | Flexural Strength, p.s.i. | Flexural Modulus, p.s.i. |
| A* | 14,700 | 0.60×10⁶ | 8,800 | 0.51×10⁶ |
| B* | 16,400 | 3.49 | 8,800 | 2.8 |
| 1 | 19,400 | 3.50 | | |
| 2 | 19,100 | 3.38 | 9,600 | 2.37 |
| 3* | 19,600 | 3.51 | | |
| 4 | 19,100 | 3.40 | | |
| 5 | 21,200 | 3.60 | | |
| 6 | 20,000 | 3.58 | | |
| 7 | 17,700 | 3.50 | | |
| C | 12,000 | 0.30 | | |
| D** | 19,700 | 1.55 | 6,400 | 0.41 |
| 8** | 21,000 | 1.98 | 12,500 | 1.06 |
| 9** | 19,000 | 1.93 | 10,000 | 0.74 |
| 10** | 22,500 | 2.04 | 13,800 | 1.03 |
| 11 | 25,600 | 1.97 | | |

*2 hour boil.  **4 hour boil.

The above table illustrates the improved mechanical properties achieved by the coupling capability of the phosphorus-containing compounds of this invention. Dry flexural strengths of the reinforced compositions are uniformly improved over the filled compositions regardless of variation within the scope of this invention of substituent groups on the coupling agent. Flexural modulus of the reinforced polyesters is also improved depending upon the coupler utilized. The couplers used in the polyamide system gave significantly improved values for dry flexural modulus. Although the wet sample of filled polycaprolactam lost 67% of its dry strength and 74% of its dry modulus, the reinforced polycaprolactams lost only 40% of their flexural strengths and 50% of their moduli when subjected to a four hour boil in water.

The improved mechanical properties of the reinforced polymers permit their use in many applications for which the unreinforced polymers are unsuitable, such as the fabrication of tables, chairs, and other furniture and furniture components, heavy duty equipment housings, automobile components, and building construction components. Further, the compositions of this invention are generally useful in those applications in which unreinforced polymers have been useful but where increased strength and rigidity are desirable features.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, these compositions can be "filled" with a mineral filler, i.e. with additional inorganic particulate material which is not chemically bound to the polymer as is the reinforcing agent. As an example, a mold may be loosely filled with a mixture of large (approximately 1 centimeter in diameter) irregular mineral particles and sand, and a monomer-mineral slurry as described in the preceding examples can be poured into the mold, thereby "wetting" the large particles in the mold and filling the spaces between the particles before polymerization occurs. In such a case the reinforced polymer binds the sand and larger aggregates together in much the same way as cement binds sand and gravel together to form a finished product. As an alternate method, the mineral aggregate in the mold may be treated with a suitable coupling agent prior to the introduction of the monomer-mineral slurry so that upon casting, the entire mineral mixture is chemically bound to the polymer, thereby producing a reinforced composition wherein the reinforcing medium can exceed 95% of the total composition.

Accordingly, these and other modifications are contemplated which can be made without departing from the spirit of the described invention.

What is claimed is:
1. A reinforced polymeric composition comprising a synthetically produced polyamide and from about 5 to about 95% by weight reinforcing agent, said reinforcing agent having been treated with a phosphorus-containing compound of the formula

where R is selected from the group consisting of halogen, hydroxyl, hydrocarbyloxy, and hydrocarbyl carboxylate radicals; where R' is a polymer-reactive radical selected from the group consisting of hydrogen, alkenyl, amino, amido, ureido, epoxy, isocyanato, hydrocarbyloxycarbonyl, acyl and acyloxy radicals; and where R" is a radical selected from the group consisting of R, R', and hydrocarbyl radicals, at least 50% of said reinforcing agent being an inorganic material having an alkaline surface or a capability to acquire an alkaline surface upon treatment with a base.

2. A reinforced polymeric composition according to claim 1 wherein said phosphorus-containing compound is diethyl ethyl-11-undecanatophosphonate.

3. A reinforced polymeric composition according to claim 1 wherein said phosphorus-containing compound is diethyl 3-(aminopropyl)phosphonate.

4. A reinforced polymeric composition according to claim 1 wherein said phosphorus-containing compound is diethyl ethyl-3-propionatophosphonate.

5. A reinforced polymeric composition according to claim 1 wherein said polymer is a polycaprolactam produced by a base-catalyzed, substantially anhydrous polymerization.

6. A reinforced polymeric composition according to claim 1 wherein said polymer is a polyamide and said R' group is selected from the group consisting of amino, amido, epoxy, and hydrocarbyloxycarbonyl radicals.

7. A process of preparing reinforced polymeric compositions comprising
    (a) contacting a phosphorus-containing compound of the formula

wherein R is selected from the group consisting of halogen, hydroxyl, hydrocarbyloxy, and hydrocarbyl carboxylate radicals; R' is a polymer reactive radical selected from the group consisting of hydrogen, alkenyl, amino, amido, ureido, epoxy, isocyanato, hydrocarbyloxycarbonyl, acyl and acyloxy radicals; and R" is a radical selected from the group consisting of R, R', and hydrocarbyl radicals, with from about 5 to about 95% by weight based on said composition of a reinforcing agent to prepare a mineral adduct having appended polymer-reactive groups, at least 50% of said reinforcing agent being an inorganic material having an alkaline surface or a capability to acquire an alkaline surface upon treatment with a base, and
    (b) conducting a polymerization of a polyamide-forming monomer system reactive with said appended groups in the presence of said mineral adduct.

8. A process according to claim 7 wherein the mineral adduct is formed in the presence of said monomer.

9. A process according to claim 7 wherein the mineral adduct is formed prior to addition of said monomer.

10. A process of preparing reinforced polymeric compositions comprising
    (a) contacting diethyl ethyl-11-undecanatophosphonate with from about 5 to 95% by weight based on said composition of a reinforcing agent to prepare a mineral adduct having appended ethyl undecanoate groups, at least 50% of said reinforcing agent being an inorganic material having an alkaline surface or a capability to acquire an alkaline surface upon treatment with a base, and
    (b) conducting a base-catalyzed, substantially anhydrous polymerization of ε-caprolactam in the presence of said mineral adduct so that said appended groups are incorporated into the polymer molecule.

11. A process of preparing reinforced polymeric compositions comprising
    (a) contacting diethyl 3-aminopropylphosphonate with from about 5 to about 95% by weight based on said composition of a reinforcing agent to prepare a mineral adduct having appended propyl amine groups, at least 50% of said reinforcing agent being an inorganic material having an alkaline surface or a capability to acquire an alkaline surface upon treatment with a base, and
    (b) conducting a base-catalyzed, substantially anhydrous polymerization of ε-caprolactam in the presence of said mineral adduct so that said appended groups are incorporated into the polymer molecule.

12. A process of preparing reinforced polymeric compositions comprising
    (a) contacting diethyl ethyl-3-propionatophosphonate with from about 5 to about 95% by weight based on said composition of a reinforcing agent to prepare a mineral adduct having appended ethyl propionate groups, at least 50% of said reinforcing agent being an inorganic material having an alkaline surface or a capability to acquire an alkaline surface upon treatment with a base, and
    (b) conducting a base-catalyzed, substantially anhydrous polymerization of ε-caprolactam in the presence of said mineral adduct so that said appended groups are incorporated into the polymer molecule.

References Cited
UNITED STATES PATENTS

| | | | |
|---|---|---|---|
| 2,751,369 | 6/1956 | Te Grotenhuis | 260—41 |
| 2,934,555 | 4/1960 | O'Brien et al. | 106—77 |
| 3,009,897 | 11/1961 | Ludington et al. | 260—40 |
| 3,134,744 | 5/1964 | Starck et al. | 260—40 |
| 3,150,208 | 9/1964 | Carson et al. | 260—40 |
| 3,156,606 | 11/1964 | Blumberg | 161—176 |
| 3,206,418 | 9/1965 | Giberson | 260—37 |
| 3,255,276 | 6/1966 | Winter et al. | 260—30.6 |

FOREIGN PATENTS 1,332,060  6/1963  France.

OTHER REFERENCES

A. D. F. Toy and L. V. Brown, Industrial and Engineering Chemistry, vol. 40, December 1948, pp. 2276–77.

T. M. Frunze, V. V. Korshak, L. V. Kozlov, and V. V. Kurashev, Vysokomolekuliaryne Soeaineniia, vol. 1, No. 5, May 1959; pp. 677–78, 680–81 relied upon.

MORRIS LIEBMAN, *Primary Examiner.*

J. E. CALLAGHAN, *Assistant Examiner.*